United States Patent [19]

van Woesik

[11] Patent Number: 5,553,181

[45] Date of Patent: Sep. 3, 1996

[54] FIBRE OPTIC CONNECTOR AND METHOD OF FORMING A FIBRE CONNECTION

[75] Inventor: Egbertus T. C. M. van Woesik, s'-Hertogenbosch, Netherlands

[73] Assignee: The Whitaker Corporation, Wilmington, Del.

[21] Appl. No.: 409,625

[22] Filed: Mar. 23, 1995

Related U.S. Application Data

[63] Continuation of Ser. No. 163,788, Dec. 9, 1993, abandoned.

[30] Foreign Application Priority Data

Jan. 7, 1993 [GB] United Kingdom .................. 9300207

[51] Int. Cl.$^6$ .................................................. G02B 6/36
[52] U.S. Cl. .................................................. 385/85; 385/147
[58] Field of Search ............................ 385/76–85, 147, 385/72, 60, 61, 62, 63, 66, 67; 30/1, 357; 83/13, 942, 947

[56] References Cited

U.S. PATENT DOCUMENTS

| | | | |
|---|---|---|---|
| 3,789,485 | 2/1974 | Gudmestad | 385/78 |
| 4,084,308 | 4/1978 | Runge | 29/527.2 |
| 4,182,017 | 1/1980 | Ford et al. | 29/428 |
| 4,195,045 | 3/1980 | Mead | 264/1 |
| 4,333,705 | 6/1982 | Mead | 350/96.20 |
| 4,643,520 | 2/1987 | Margolin | 350/96.20 |
| 4,648,688 | 3/1987 | Ashman et al. | 350/96.20 |
| 4,741,590 | 5/1988 | Caron | 385/85 |
| 4,747,659 | 5/1988 | Takahashi | 385/72 |
| 4,770,487 | 9/1988 | Williams | 350/96.20 |
| 4,786,134 | 11/1988 | Fort et al. | 350/96.20 |
| 4,802,728 | 2/1989 | Komatsu | 385/78 |
| 4,988,159 | 1/1991 | Turner et al. | 385/78 |

FOREIGN PATENT DOCUMENTS

| | | |
|---|---|---|
| 2055968 | 5/1992 | Canada. |
| 9015916 | 3/1991 | Germany. |
| 62-118306 | 5/1987 | Japan. |
| 2-106214 | 4/1990 | Japan. |

Primary Examiner—John Ngo

[57] ABSTRACT

A fibre optic connector includes a retaining section for receiving a retaining clip, and a severable section. The connector housing 20 has a cable receiving bore which receives the fibre cable. The fibre cable is receivable in the bore such that the fibre project beyond a front face of the severable portion. The severable end portion is removable adjacent to the notch to form a clean end face.

5 Claims, 6 Drawing Sheets

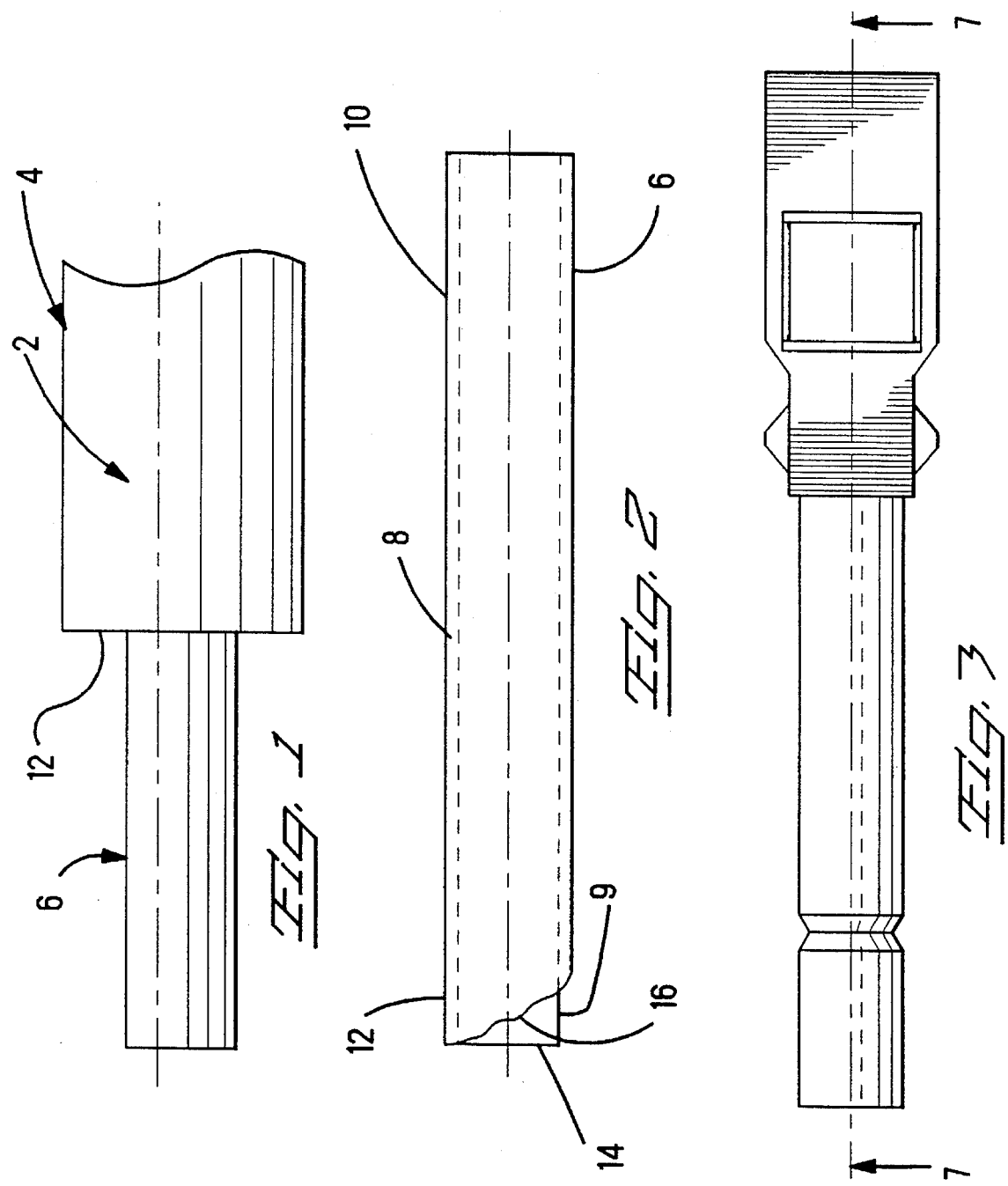

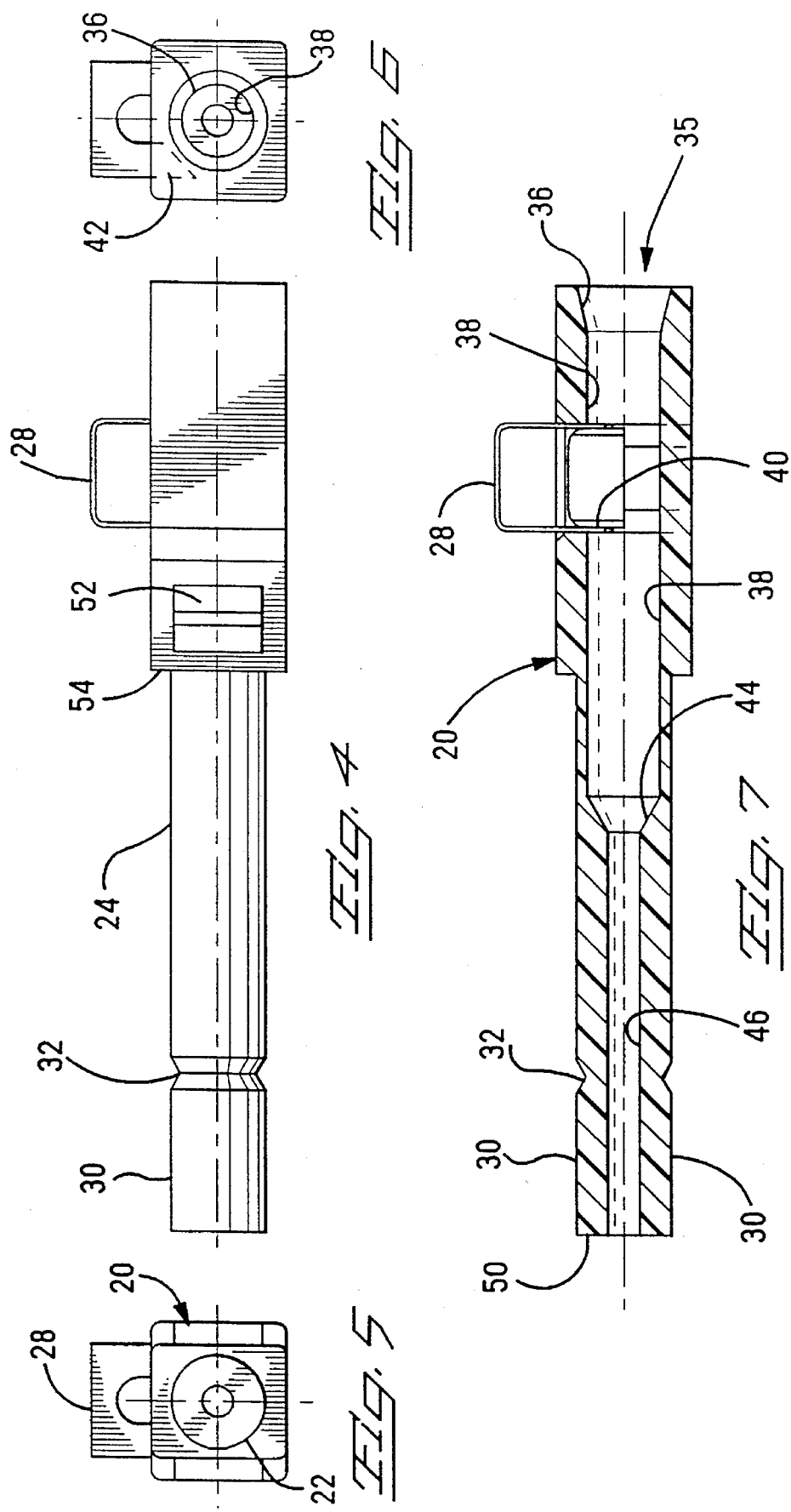

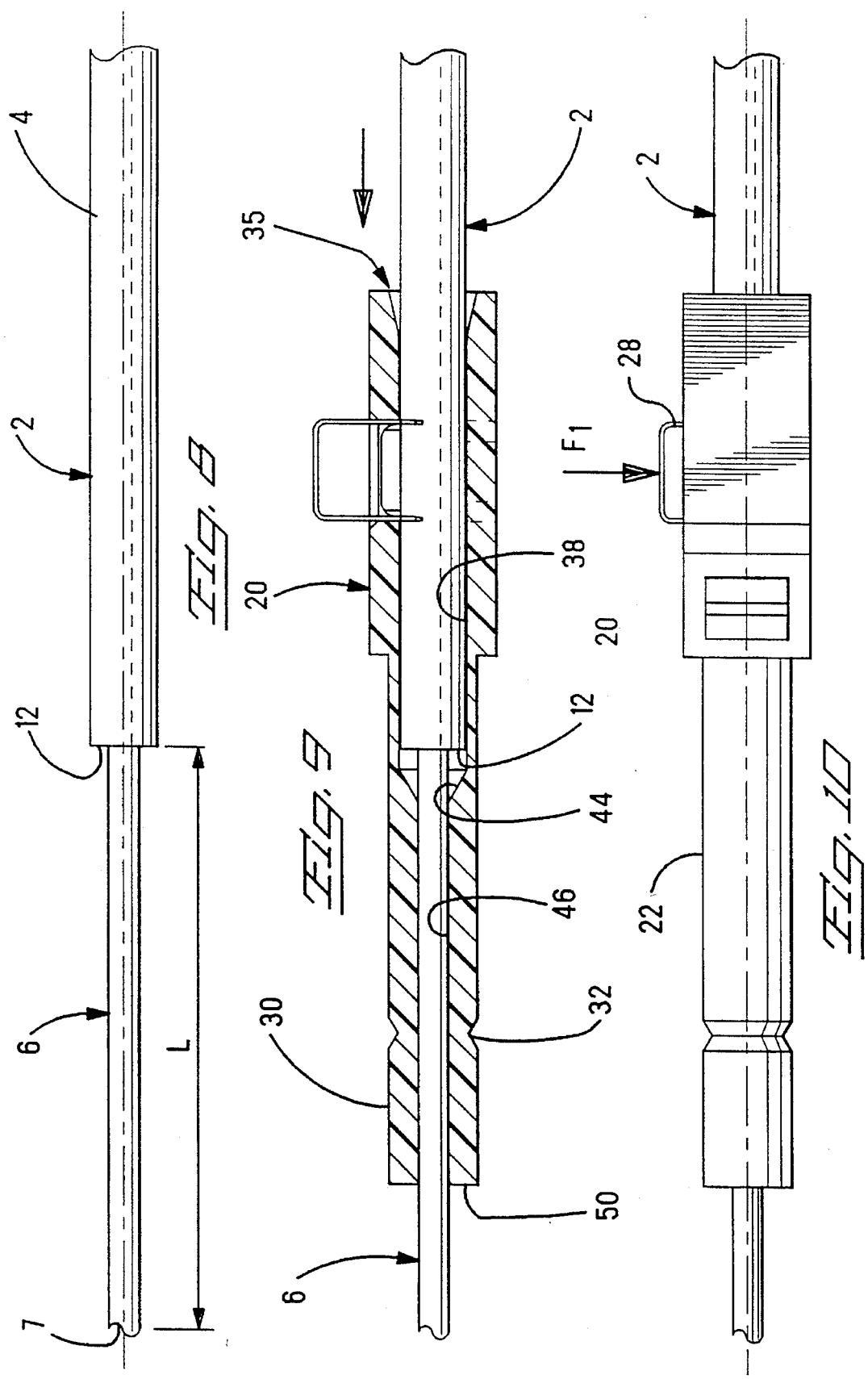

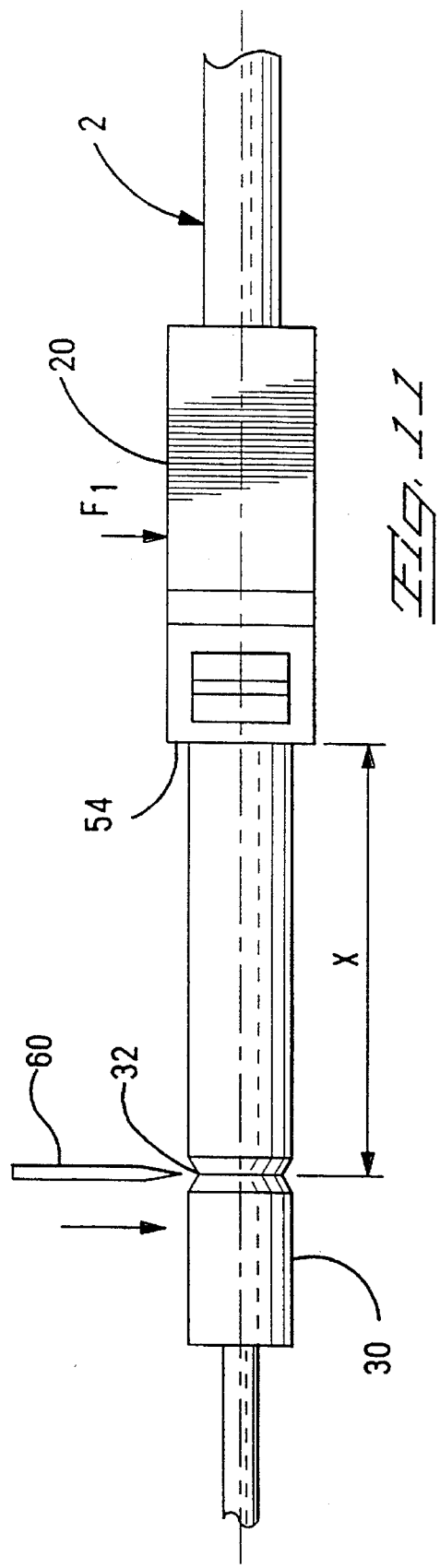
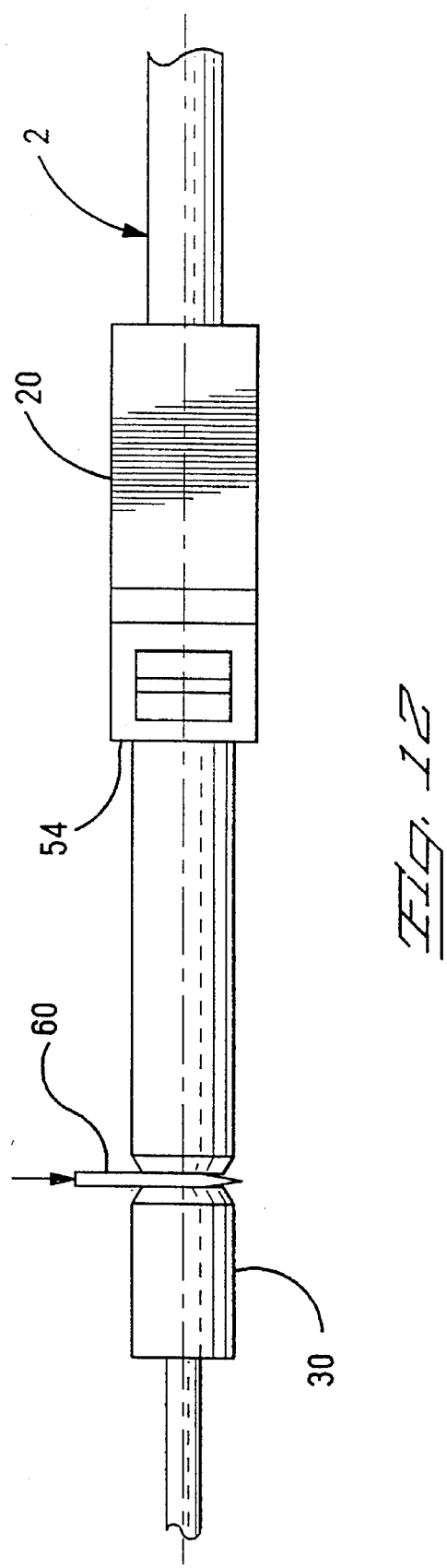

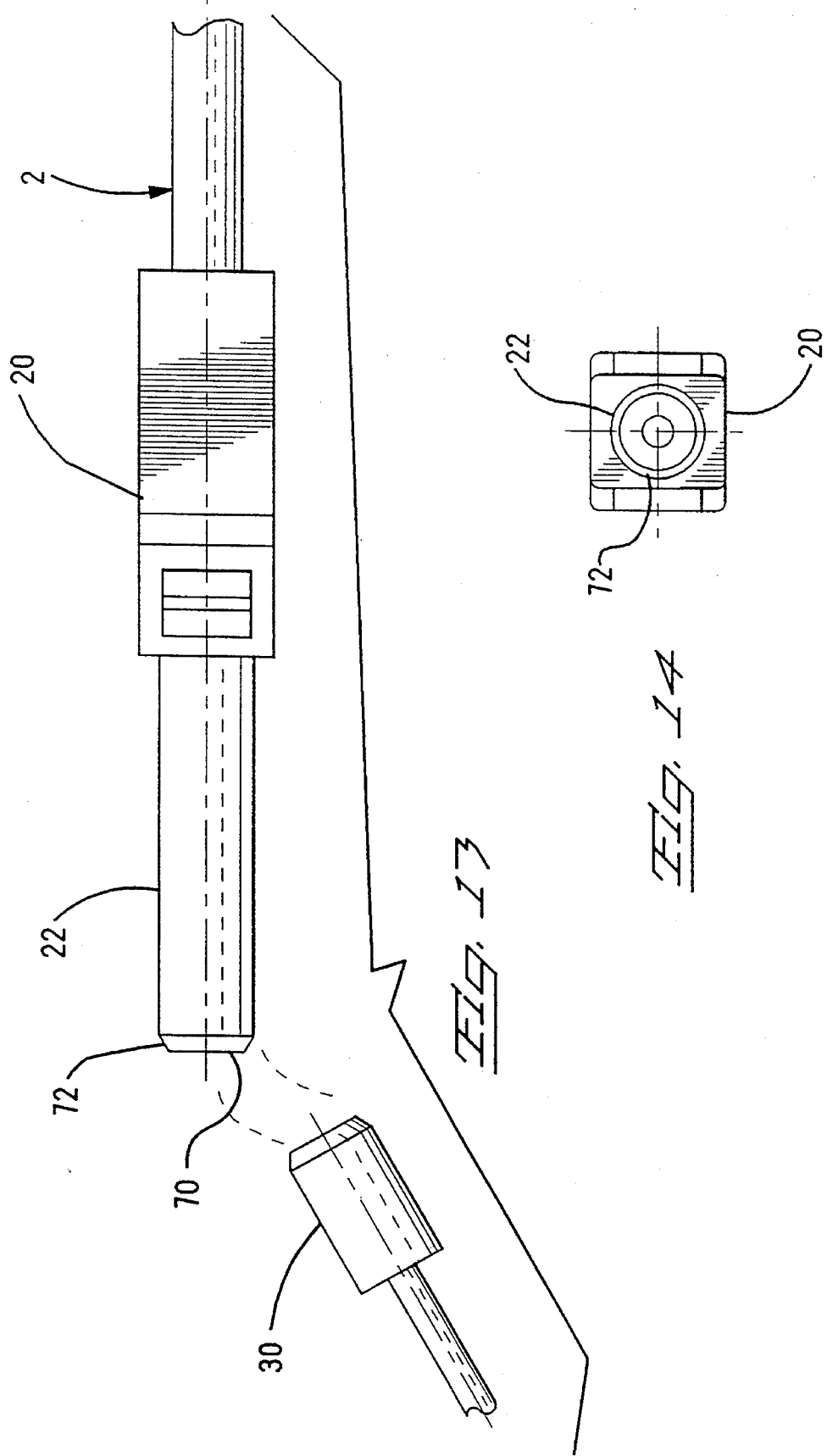

FIBRE OPTIC CONNECTOR AND METHOD OF FORMING A FIBRE CONNECTION

This application is a Continuation of application Ser. No. 08/163,788 filed Dec. 9, 1993, now abandoned.

BACKGROUND OF THE INVENTION

1. Field of the Invention

The subject of the invention relates to a connector for terminating fibre optic cables.

2. Description of the Prior Art

The optical qualities of a fibre optic connector are often dependant upon the ability to cut the optical fibre without destroying the surrounding cladding. It is easy to cut an optical fibre including the surrounding jacket, as the jacket supports the inner cladding and fibre for cutting. However most optical connectors require a bare fibre, including the core and cladding, to be inserted through a rear side of a fibre connector. Thus it is usually required to strip the outer insulating jacket from the fibre cable, in a manner similar to stripping the insulation from a metal conductor of an insulated wire. However when the fibre core and cladding are bared, and the fibre end is cut, the cladding is often times chipped and severed at the free end, and it is this end face which is used as the mating interface with the complementary connector or other optical device. Thus, much time and effort has been spent trying to perfect methods for notching and cutting fibre ends so as to reduce the destruction to the fibre cladding at the fibre free end.

SUMMARY OF THE INVENTION

An object of the invention then is to provide a method and a method of termination to enhance the mating interface of a fibre optic connector.

The objects of the invention have been accomplished by providing a method of forming an fibre connection characterized by the steps of providing a connector housing having a front mating end and a cable receiving end, where the housing has a bore therethrough for the receipt of the bared fibre;

inserting a fibre cable having a bared fibre end into the end receiving end until the bared fibre cable is adjacent to the front mating end;

retaining the cable in the connector; and cutting off a portion of the front mating end and bared fibre to provide a planar mating face.

BRIEF DESCRIPTION OF THE DRAWINGS

FIG. 1 shows a standard fibre cable including the bared fibre and jacket;

FIG. 2 shows a free end of the bared fibre showing at the free end, the destroyed cladding;

FIG. 3 is a top view showing a connector in accordance with the preferred embodiment of the invention;

FIG. 4 is a side plan view of the connector shown in FIG. 3;

FIG. 5 is a front plan view of the connector viewed in FIG. 4;

FIG. 6 is an end view of the connector as shown in FIG. 4;

FIG. 7 is a cross sectional view taken through lines 7—7 of FIG. 3;

FIG. 8 is a view of a fibre cable with the jacketing stripped to the proper length;

FIG. 9 is a partial cross sectional view similar to that of FIG. 7 showing the fibre cable of FIG. 8 inserted into the connector;

FIG. 10 shows the downward movement of the retainer clip which holds the fibre cable in a longitudinally fixed position;

FIG. 11 shows the final movement of the retainer into its final position as well as the initial movement of a cutting blade to sever the front end of the fibre connector;

FIG. 12 shows the complete severing of the front end of the connector;

FIG. 13 shows the front end of the connector falling free of the complete fibre connector;

FIG. 14 shows the front mating end as completed;

DETAILED DESCRIPTION OF THE PREFERRED EMBODIMENT

Figure 18:
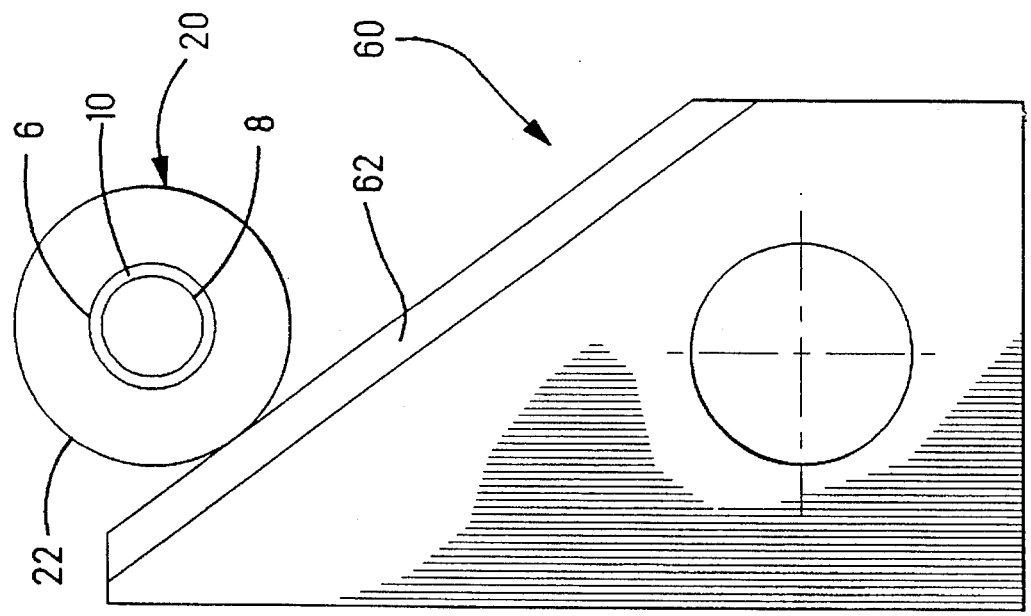
FIG. 18 is a diagrammatical view of the cutting operation.
Figure 16:
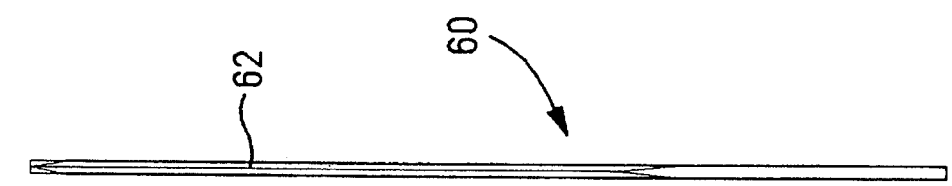
FIG. 16 is an end view of the cutting knife shown in FIG. 15.
Figure 17:
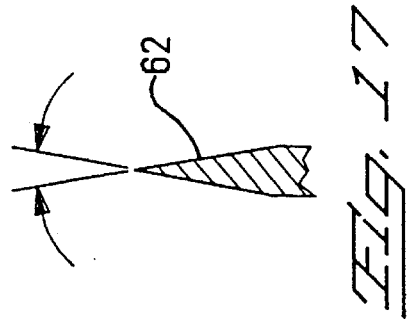
FIG. 17 shows a view through lines 17—17 of FIG. 15.
Figure 15:
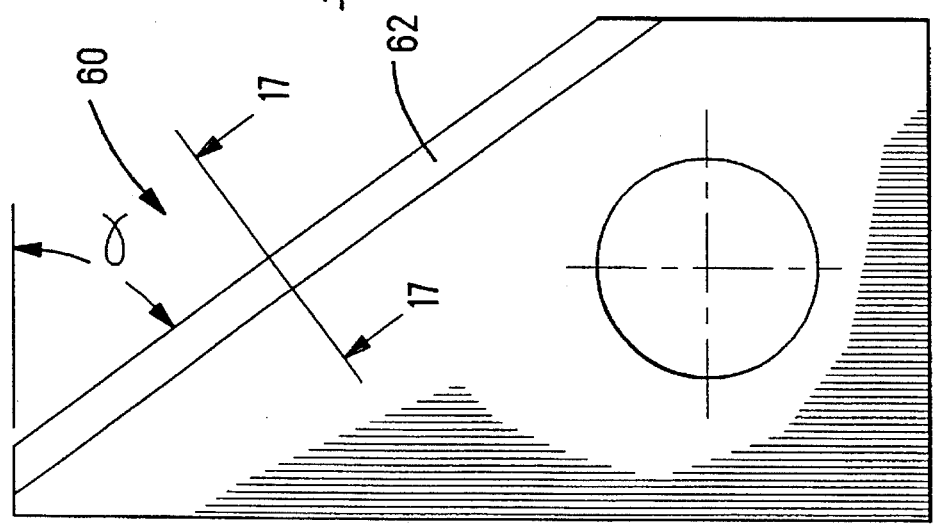
FIG. 15 shows a diagrammatical view of the knife which is used for the cutting operation.

With respect first to FIG. 1, a fibre cable is shown generally at 2 which includes an outer insulating jacket at 4 which covers a fibre 6. The fibre 6 is shown in FIG. 2 as including an inner core 8 and an outer cladding at 10. As mentioned before, when a fibre cable is cut through the outer jacket 4, there is no shattering of the outer cladding material, as the jacket material protects the cladding through the cutting operation. However most fibre connectors, require that the fibre cable be prepared as shown in FIG. 1 where the outer jacket 4 is stripped at 12 and pulled forward (leftward as viewed in FIG. 1) to expose the bared fibre 6. The next step in preparing the cable is to cut the free end 12 of the fibre to provide an exposed bared fibre of a specific length, and to provide a mating fibre end at 14. Cutting the fibre without the insulative jacket 4 however causes chattering and destruction of the cladding material 10 towards the free end 12 as shown by reference numeral 16 in FIG. 2. When this fibre free end 12 is now inserted into a fibre connector, light loss occurs by the destroyed cladding material at the free end 12.

With respect now to FIGS. 3–7, an improved connector will be described for use with a cable similar to that as shown in FIG. 1. With reference first to FIG. 3 and 4, a fibre connector is shown generally at 20 which is provided by an insulating housing generally comprised of a relatively soft material such as a polyvinylchloride (PVC) or a polyester material. The connector 20 includes a front mating end 22 having an outer diameter 24 which is generally received in the bore of a mating connector, or like electronic device. The connector 20 further includes a terminating section at 26 including a U-shaped retaining clip 28 which is relatively conventional but will be described in greater detail herein. Finally the connector 20 includes a severable section at 30 forwardly located of a notch at 32.

With reference now to FIGS. 3–7, the connector 20 will be described in greater detail. The connector housing 20 includes a cable receiving end at 34 having a receiving bore shown 35, defined by a lead-in section 36 and a cylindrical bore at 38. The retaining clip 20 is positioned in a transverse clip receiving groove at 40 which intersects with the bore 38, but it should be appreciated that when the clip is in the position shown in FIGS. 4 and 7, that the free end of the clip does not interfere with the bore 38 such that a fibre cable can be inserted without hitting the clip ends. This is best shown in FIG. 6 where the end of one of the clip retaining arms 42 is shown in phantom above the periphery of the bore 38. The bore 38 extends forwardly to a frusto-conical section 44 which narrows down to a fibre receiving bore 46 which extends forwardly beyond the notch through the severable portion 30 and to an end 50 of the severable portion. It should be understood that the diameter of the bore 38 is profiled to receive the outside diameter of the fibre jacket 4 whereas the inside diameter of bore 46 is profiled to receive the fibre, including the core 8 and cladding 6. As shown in FIGS. 3 and 4, the housing 20 further includes latching members 52 and a forwardly facing shoulder at 54.

With respect now to FIGS. 8–13, the method of assembling the connector and fibre will be described in greater detail. As shown in FIG. 8, a fibre cable 2 is shown which is similar to that in FIG. 1, except that the cable has not been cut to length at its free end such that the fibre 6 has a rough end at 7. The outer jacket 4 is stripped to expose the fibre cable 6 to a length L which is somewhat greater than the distance from the leading edge of the frusto conical portion 44 and the front face 50 of the severable portion 30. Said differently, enough core 6 is exposed such that when the fibre cable 2 is inserted through the bore 35, to a position where the end face 12 of the insulation abuts the shoulder formed by frusto-conical portion 44, that a sufficient length of 6 is exposed beyond the front edge of the end 50 as shown in FIG. 9. When the fibre cable 2 is in its fully forward position as it is described above, a force F1 may be applied to the retainer clip 28 as shown in FIG. 10 to a first locked position which will retain the cable from axial movement during the transport of the connector housing 20 and cable 2 to a cutting station.

With reference now to FIGS. 11–13, the connector housing 20 and fibre cable 2 are moved to a position where the severable portion 30 can be removed. As shown in FIG. 11, a cutting knife 60 is shown positioned proximate to the notch 32, and a force F2 can be subjected to the retainer 28, and the knife member 60 can be projected downwardly to begin severing the end portion 30. As shown in FIG. 12, the knife member 60 is protruding through the section 30 and through the fibre 6 whereas in FIG. 13 the section 30 is completely severed from the connector member 20 leaving a clean end face at 70. By providing the notch at 32, and by cutting through the mating end 22 at the notch, a chamfered lead-in section 72 is thereby formed.

Advantageously, it has been shown that by cutting through the cable and through the connector end portion 22 as described above, that the light loss can be kept to a minimum of 2.2 dB, without any polishing of the free end. If this optical quality is not adequate, the free end can also be polished to achieve a light loss of only one dB. Also advantageously, if polishing is necessary, the polishing time required is merely seconds, as the connector end face and the fibre are cut to such a clean end face, and as the connector end 22 and the fibre 6 are cut simultaneously such that they are at the exact same axial length.

It should also be appreciated that this type of connector assembly could be utilized in a mass production operation, an automatic harness making apparatus could feed lengths of fibre cable to a specific length, and then strip the ends of the insulation a distance L. The stripped end portion could be automatically inserted into the receiving bore 35 of the connector housing 20 whereupon the retainer 28 is moved to a partially retaining position as described with respect to FIG. 10. The assembly as shown in FIG. 10 of the connector housing 20 and the fibre cable 2 could then be moved to a cutting station where the knife member 60 is automatically registered by distance X from the shoulder 54 as viewed in FIG. 11.

In the preferred embodiment of the invention the cutter member 60 is a ceramic blade having an angled cutting edge 62 where in the preferred embodiment of the invention, the angle $\alpha$ is 45°. Also preferably the cutting edge 62 is a symmetrical sharpened tip where in the preferred embodiment of the invention, $\beta = 20°$. It should be appreciated that the combination of the sharpened tip 62 and the angle $\alpha$, in combination, provide for a cutting and slicing action. The sharpened tip 62 provides for the cutting through of the connector housing 20 and through the fibre 6 but also through the connector end 22. Furthermore the angled cutting edge at an angle $\alpha$ provides for relative movement of the cutting edge with respect to the connector 20 and fibre 6 providing a simulated slicing action.

I claim:

1. A method of forming a fibre connection, characterized by the steps of:

providing a connector housing having a front mating end and a cable receiving end with the housing having a bore therein for the receipt of a bared fibre end and a portion of a fibre cable, the front mating end having a notch towards a front end thereof;

inserting the portion of the fibre cable and the bared fibre end into the cable receiving end until the bared fibre end extends beyond said notch;

retaining the fibre cable in the connector; and cutting off a section of the front mating end and the bared fibre end at said notch thereby providing a planar mating face.

2. The method of claim 1, characterized in that the bared fibre end extends beyond the front mating end, prior to the cutting operation.

3. The method of either claims 1 or 2, characterized in that the connector housing is provided with a notch towards a front end thereof, and the connector housing is cut through the notch thereby forming a chamfered leading end.

4. The method of any of claim 1, characterized in that the cutting step is accomplished with a ceramic knife blade.

5. The method of claim 1, characterized in that the notch is V-shaped thereby forming a chamfered leading end.

\* \* \* \* \*